(Model.)
C. F. SMITH.
RING GAGE FOR JEWELERS.
No. 266,324. Patented Oct. 24, 1882.
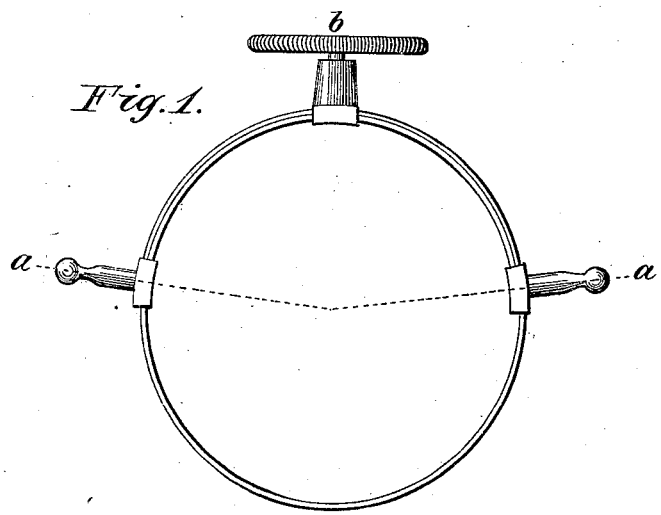
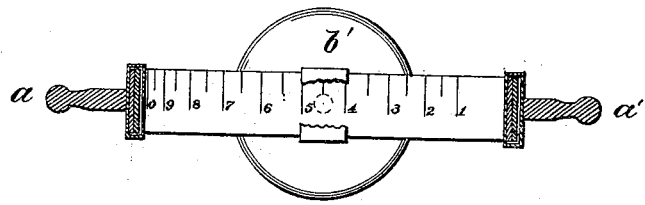
Witnesses.
James M. Dodge
Willmer F. Martin
Inventor.
Charles Francis Smith

UNITED STATES PATENT OFFICE.

CHARLES F. SMITH, OF VINELAND, NEW JERSEY.

RING-GAGE FOR JEWELERS.

SPECIFICATION forming part of Letters Patent No. 266,324, dated October 24, 1882.

Application filed May 31, 1882. (Model.)

*To all whom it may concern:*

Be it known that I, CHARLES FRANCIS SMITH, of Vineland, Cumberland county, New Jersey, have invented a new and useful Ring-Gage for Jewelers' Use, of which the following is a specification.

My invention relates to an improvement in ring-gages by the use of which a jeweler or other person may quickly and accurately measure around a finger or any small cylindrical object, determining its size in accordance with the standard of sizes in use among dealers in and manufacturers of finger-rings. This measurement has heretofore been made by repeated trials with graduated rings until one of the desired size was found, or by means of a conical stick of wood or metal upon which the standard sizes are marked, the size of the finger being determined by measuring with a cord or flexible wire, and then applying the measure to the gage-stick. My invention will enable the jeweler to do this requisite measuring accurately and much more easily and expeditiously than by any means heretofore used, and may be specifically described as follows, reference being had to the accompanying drawings.

Figure 1 is a top view of the ring-gage; and Fig. 2 is a sectional view of the same, showing the gage-marks.
Similar letters refer to similar parts.

The main portion consists of a thin and narrow ring or coil of steel or other metal having the requisite elasticity, so arranged that the outer surface at one end of the coil shall move along the inner surface of the other end, as shown in Fig. 1. Fixed at each end of the coil, and passing around the contiguous portion, is a thin metallic band or clasp provided with suitable handles, $a$ and $a'$. By moving these handles toward or away from each other the free portions of the coil pass through the bands, diminishing or increasing the size of the ring, as the operator may desire. The set-screw $b$ works in a free clasp, as shown, and when tightened prevents slipping when the measurement has been made. The figures and marks by which the sizes are determined are begun with the inner end of the metal coil, and are placed along its inner surface, as shown in Fig. 2.

What I claim as my invention, and desire to secure by Letters Patent, is—

The combination of the metallic ring or coil, marked as herein described, with the clasps and handles $a$ $a'$ and set-screw $b$, all substantially as set forth.

CHARLES F. SMITH. [L. S.]

Witnesses:
 JAMES M. DODGE,
 WILMER T. MARTIN.